United States Patent [19]
Holdsworth et al.

[11] Patent Number: 6,038,589
[45] Date of Patent: Mar. 14, 2000

[54] APPARATUS, METHOD AND COMPUTER PROGRAM PRODUCT FOR CLIENT/SERVER COMPUTING WITH A TRANSACTION REPRESENTATION LOCATED ON EACH TRANSACTIONALLY INVOLVED SERVER

[75] Inventors: Simon Antony James Holdsworth, Andover; Martin Mulholland; Kathryn Sarah Warr, both of Winchester, all of United Kingdom

[73] Assignee: International Business Machines Corporation, Armonk, N.Y.

[21] Appl. No.: 08/991,909

[22] Filed: Dec. 16, 1997

[30] Foreign Application Priority Data

Aug. 1, 1997 [GB] United Kingdom .................. 9716199

[51] Int. Cl.[7] ............................................ G06F 15/16
[52] U.S. Cl. ........................................ 709/201; 709/203
[58] Field of Search .................................. 709/203, 201, 709/101, 108; 707/10, 202, 103, 104; 714/4, 15, 9

[56] References Cited

U.S. PATENT DOCUMENTS

| | | | |
|---|---|---|---|
| 5,440,744 | 8/1995 | Jacobson et al. ...................... | 395/650 |
| 5,452,459 | 9/1995 | Drury et al. ........................... | 395/700 |
| 5,608,720 | 3/1997 | Biegel et al. .......................... | 370/249 |
| 5,768,587 | 6/1998 | Freund et al. ......................... | 395/671 |
| 5,790,789 | 8/1998 | Suarez .................................. | 395/200.3 |
| 5,872,969 | 2/1999 | Copeland et al. ..................... | 395/671 |
| 5,872,971 | 2/1999 | Knapman et al. ..................... | 395/671 |
| 5,878,428 | 3/1999 | Copeland et al. ..................... | 707/103 |
| 5,920,863 | 7/1999 | McKeehan et al. ................... | 707/10 |

OTHER PUBLICATIONS

Orb TP, "Transaction Processing for Object Request Broker," http://spam.xopen.org/act-pubs/D2n_orbtpwp12.htm, No date.

*Primary Examiner*—Mehmet B. Geckil
*Attorney, Agent, or Firm*—Edward H. Duffield

[57] ABSTRACT

A server in a client/server computing system where a distributed transaction is being carried out, has: a server resource having local data associated therewith; a software element for receiving a registration request from the server resource requesting that the server resource be registered in a transaction, after the server resource has received the transaction context in the explicit transaction propagation mode; and a software element for creating a distributed transaction object representing the transaction in response to receipt of the registration request, the distributed transaction object persisting until the transaction is completed.

12 Claims, 2 Drawing Sheets

APPARATUS, METHOD AND COMPUTER PROGRAM PRODUCT FOR CLIENT/SERVER COMPUTING WITH A TRANSACTION REPRESENTATION LOCATED ON EACH TRANSACTIONALLY INVOLVED SERVER

FIELD OF THE INVENTION

The invention relates to the field of client/server (also known as "distributed") computing, where one computing device ("the client") requests another computing device ("the server") to perform part of the client's work. The client and server can also be both located on the same physical computing device.

BACKGROUND OF THE INVENTION

Client/server computing has become more and more important over the past few years in the information technology world. This type of distributed computing allows one machine to delegate some of its work to another machine that might be, for example, better suited to perform that work. For example, the server could be a high-powered computer running a database program managing the storage of a vast amount of data, while the client is simply a desktop personal computer (PC) which requests information from the database to use in one of its local programs.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server applications processing results back to the requesting client application.

Details of how OOP techniques have been integrated with heterogeneous client/server systems are explained in U.S. Pat. No. 5,440,744 and European Patent Published Application No. EP 0 677,943 A2. These latter two publications are hereby incorporated by reference. However, an example of the basic architecture will be given below for contextual understanding of the to invention's environment.

As shown in FIG. 1, the client computer 10 (which could, for example, be a personal computer having the IBM OS/2 operating system installed thereon) has an application program 40 running on its operating system ("IBM" and "OS/2" are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object at the server, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms with distributed objects as is shown in FIG. 1. The OMG has set forth published standards by which client computers (e.g. 10) communicate (in OOP form) with server machines (e.g. 20). As part of these standards, an Object Request Broker (called CORBA—the Common Object Request Broker Architecture) has been defined, which provides the object-oriented bridge between the client and the server machines. The ORB decouples the client and server applications from the object oriented implementation details, performing at least part of the work of the first and second logic means 50 and 90 as well as the connection means 80.

As part of the CORBA software structure, the OMG has set forth standards related to "transactions" and these standards are known as the OTS or Object Transaction Service. See, e.g., CORBA Object Transaction Service Specification 1.0, OMG Document 94.8.4. Computer implemented transaction processing systems are used for critical business tasks in a number of industries. A transaction defines a single unit of work that must either be fully completed or fully purged without action. For example, in the case of a bank automated teller machine from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, a transaction affects resources managed at the local automated teller device as well as bank balances managed by a bank's main computer. Such transactions involve one particular client computer (e.g, 10) communicating with one particular server computer (e.g., 20) over a series of client requests which are processed by the server. The OMG's OTS is responsible for coordinating these distributed transactions.

Usually, an application running on a client process begins a transaction which may involve calling a plurality of different servers, each of which will initiate a server process to make changes to its local data according to the instructions contained in the transaction. The transaction finishes by either committing the transaction (and thus all servers finalize the changes to their local data) or aborting the transaction (and thus all servers "rollback" or ignore the changes to their local data). To communicate with the servers during the transaction (e.g., instructing them to either commit or abort their part in the transaction) one of the processes involved must maintain state data for the transaction. According to the OTS standard, this involves the process setting up a series of objects, one of which is a coordinator object which coordinates the transaction with respect to the various servers.

The main purpose of this coordinator object is to keep track of which server objects are involved in the transaction, so that when the transaction is finished, each server object involved in the transaction can be told to commit the changes made locally to the local database associated with that server object, in a single unified effort. This ensures that no server object makes a data change final without the other server objects which are also involved in the same transaction doing so. Thus, each server object which is to join a transaction must first register with the coordinator object so that the coordinator object will know of the server object's existence, its wish to join the transaction, and where to find the server object (e.g., which server machine the it server object resides on) when it comes time to complete the transaction (where the coordinator object instructs all server objects to make the changes to their respective local data final).

Usually, what happens is that a server object gets involved in a transaction when another server object (or the original client object which started the transaction) sends a request to the server object for the server object to do some work. This latter request carries some information, called the transaction context, to inform the server object that the request is part of a transaction. There are two different ways to transfer this transaction context to a server object via a request: the implicit and explicit modes of transaction propagation. The explicit mode is where the application program which sends the request to the new server object has to explicitly pass the transaction context, for example, as a parameter in the request. The implicit mode is where the transaction context is transferred "under the covers" and thus the application program need not pass the transaction context to the server object. Once a server object finds out that it is to be involved in a transaction, it then makes a registration request with the coordinator object.

Applicant has noted some problems which occur with OTS implementations using the explicit mode of transaction propagation. During registration of a server object to the transaction, a proxy coordinator is set up locally inside the server machine which houses the server object and the server communicates directly with this proxy coordinator object when it makes a registration request. (It should be noted that while the term "server machine" is used here, the term "server process" could also be used, to thus indicate that the distributed server objects could, in fact, be located on the same server machine but on different processes running on the server machine, and hereinafter the term "server" will be used to refer to both terms.) The proxy coordinator, in turn, passes on the registration request to the coordinator object (which is located in another process possibly on another server machine). The proxy coordinator object provides a representation of the existence of the transaction within the server housing the server object. However, the proxy coordinator does not last for the lifetime of the transaction and usually is only maintained while the server object is serving the request.

Therefore, once the server object has served the request and the proxy coordinator object is terminated, the server housing the transactionally involved server object has no way to reflect the fact that a transaction is actually happening in which that server is involved. This leads to the following consequences.

A systems administrator (a person who looks after a company's computer system) often needs to find out which transactions a particular server is currently involved in. For example, the systems administrator may wish to monitor the performance of a particular server machine and may thus wish to find out the total number of transactions currently active in that machine. Further, the systems administrator may wish to perform a coordinated shut down of all server machines in the company, and, in doing so, may wish to base the decision as to which server machine to shut down first on the total number of transactions currently active in each server machine.

Unfortunately, with the current state of the art, these types of administrative tasks are very difficult to carry out, because of the transient nature of the proxy coordinator objects.

SUMMARY OF THE INVENTION

According to a first view, the present invention provides a server in a client/server computing system where a distributed transaction is being carried out, the server having: a server resource having local data associated therewith; a software element for receiving a registration request from the server resource requesting that the server resource be registered in a transaction, after the server resource has received the transaction context via the explicit transaction propagation mode; and a software element for creating a distributed transaction object representing the transaction in response to receipt of the registration request, the distributed transaction object persisting even after the server resource's role in the transaction is finished.

According to a second aspect, the present invention provides a method of carrying out the steps set forth in the first aspect.

According to a third view, the invention provides a computer program, stored on a computer-readable storage medium, the program having program elements for, when run on a computer, performing the functions set forth in the first and second aspects of the invention.

With the present invention, it is ensured that an object representing a transaction exists in each server for the entire lifetime of the transaction. These objects can then be easily counted in order to determine the total number of transactions currently pending in which a particular server is involved. Thus, administrative tasks (e.g., coordinated server shutdowns) which require the knowledge of the number of transactions currently running on a server are greatly facilitated.

BRIEF DESCRIPTION OF THE DRAWINGS

The invention will be better understood by the below description of preferred embodiments thereof to be read while referring to the following figures.

DETAILED DESCRIPTION OF THE EMBODIMENTS

Figure 1:
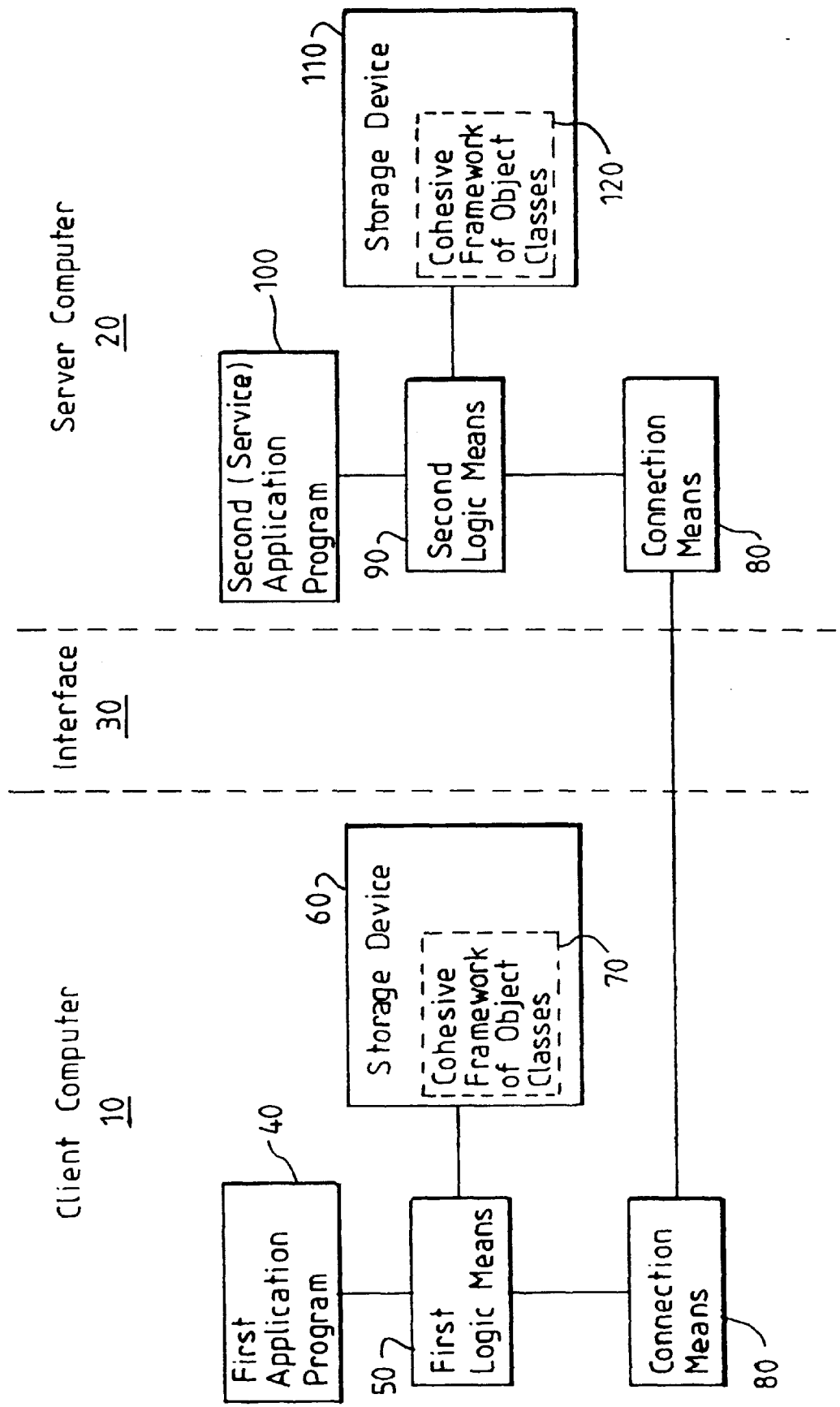
FIG. 1 is a block diagram of a well-known heterogeneous client/server architecture using object technology, in the context of which preferred embodiments of the present invention can be applied.
Figure 2:
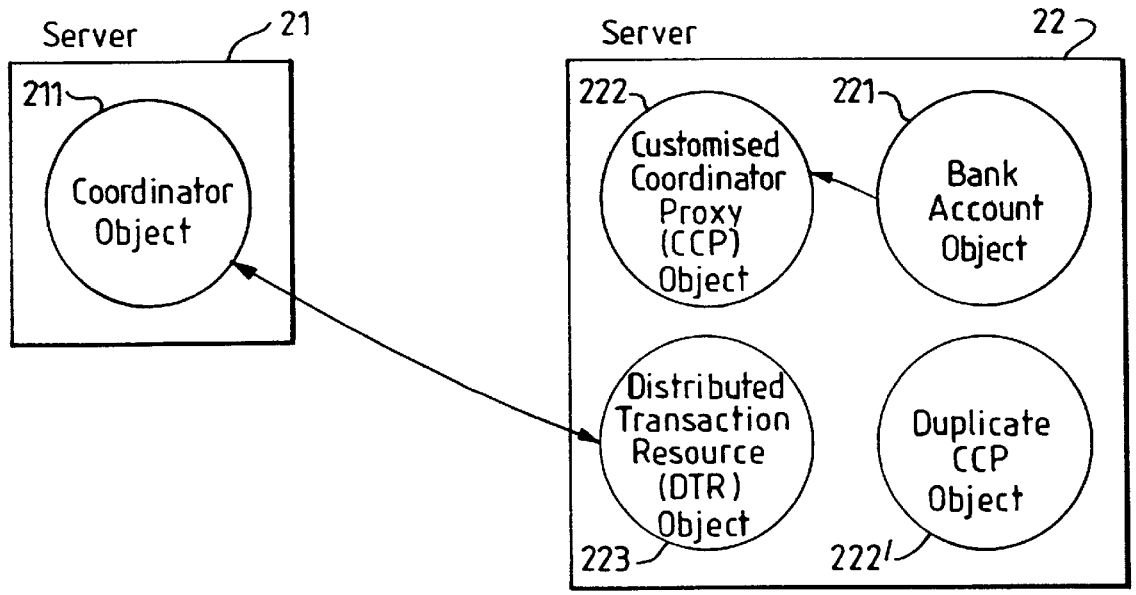
FIG. 2 is a block diagram showing the various objects instantiated within two co-transactional servers according to a first embodiment of the present invention.

In FIG. 2, one server 21 stores the transaction state data including the coordinator object 211. Server 22 is also involved in the transaction since its bank account object 221 has received the transaction context of the transaction represented by coordinator object 211 via the explicit mode of transaction propagation. The coordinator proxy object 222 is a customized coordinator proxy (CCP) object. That is, the CCP object 222 is customized so that it performs a specific function in addition to its usual function of being a temporary local version of the coordinator object 211.

Figure 3:
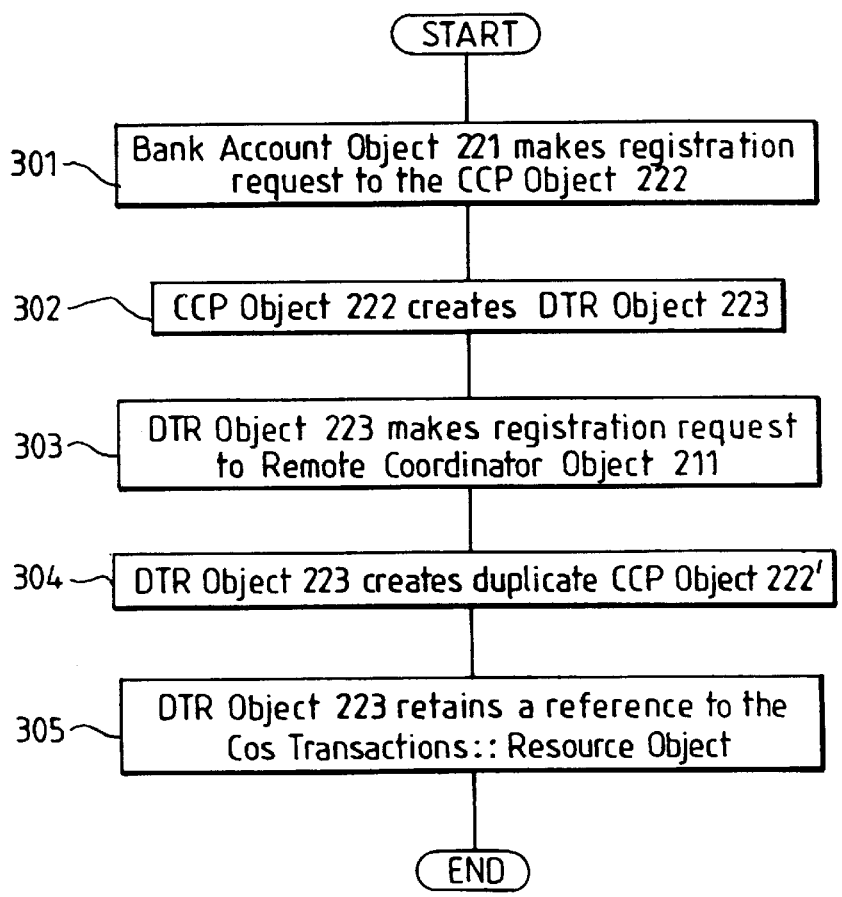
FIG. 3 is a flowchart showing the steps involved in creating a representation of a transaction within a server, according to a first embodiment of the present invention.

Specifically, the CCP object 222 is customized so that when the bank account object 221 (recoverable resource object) makes (FIG. 3's step 301) a registration request to the CCP object 222, the CCP object 222, instead of forwarding the registration request on to the coordinator object 211 in server 21 as normal, creates a new object called a distributed transaction resource (DTR) object 223 (step 302) within server 22. The bank account object 221 then passes a reference to an object known as a CosTransactions: Resource object to the CCP object 222 so that the CCP object 222 will be able to inform the bank account object 221 when the transaction is being completed.

The DTR object 223 registers itself with the remote coordinator object 211 in server 21 using the standard CORBA interface (step 303). This ensures that the DTR object 223 is notified by the coordinator object 211 during transaction completion. The coordinator object 211 thus "thinks" that the DTR 223 is a recoverable resource object that is substantively involved in the performance of the transaction (like the bank account object 221 which makes changes to local data).

The DTR object 223 then creates a duplicate 222' of the CCP object 222 (as the original CCP object 222 is destroyed when the bank account object 221 has served the transactional request)(step 304). This duplicate CCP object 222' is maintained by the DTR object 223 until the transaction is completed (again, the DTR object 223 has the ability to learn of the transaction completion because the DTR object 223 has registered with the remote coordinator object 211 as explained above). As a final step, the DTR object 223 retains (step 305) a reference to a CosTransactions::Resource object utilized by the bank account object 221 during its registration with the CCP object 222. The DTR object 223 needs to retain this reference because the CCP object 222 will be destroyed when the server 22's involvement in the transaction is completed.

When the coordinator object 211 begins the completion of the transaction (the steps involved in this completion are known as the "2-phase commit protocol"), the DTR object 223 is notified, because the DTR object 223 has registered itself with the remote coordinator object 211 at step 303. The coordinator object 211 then sends the 2-phase commit protocols (prepare and commit messages) to the DTR object 223 (as the object 211 "thinks" that the DTR 223 is a recoverable resource object substantively involved in the transaction like the object 221). The DTR 223 then forwards these 2-phase commit protocols to the CosTransactions::Resource object representing the recoverable bank account object 221. This ensures that the bank account object 221 is notified during transaction completion despite the fact that the bank account object 221 has not registered directly with the remote coordinator object 211. The DTR object 223 is thus used as a sort of "pipe" to forward the 2-phase commit protocols to the CosTransactions::Resource object of the bank account object 221.

When the coordinator object 211 informs the DTR object 223 that the transaction is completed, the DTR object 223 then destroys the duplicate CCP object 222' and then destroys itself.

Thus, the duplicate CCP object 222' exists in the server 22 during the entire lifetime of the transaction, even though the original CCP object 222 has been destroyed once the bank account object 221's direct involvement in the transaction has finished. The duplicate CCP object 222' is therefore a representation of a transaction currently pending within a server, such a representation remaining within the server even after that server's part in the transaction has finished. The representation remains in the server until the corresponding transaction is finished. The server can then be easily queried to determine how many pending transactions currently exist within that server. All that need be done is to count the number of coordinator objects (or proxies thereof) that exist within the server in question.

As an alternative embodiment, the duplicate CCP object 222' is not created at step 304. Instead, when it comes time to count the number of coordinator objects (or proxies thereof) that exist within a particular server, any DTR objects are also counted.

As a further alternative embodiment, the distributed transaction object 223 could be created as a subordinate coordinator object (which are usually used in the implicit transaction context propagation mode) instead of a resource object as has been described above. This again eliminates the need to create the object 222'.

Systems management is greatly facilitated since it is a simple matter to count the number of coordinator objects (and DTR objects in the second embodiment) existing in a server to find out the number of transactions pending in that server. For example, coordinated server shutdown of a plurality of servers based on the number of transactions pending in each server can now be easily performed, as can the monitoring of an individual server's performance based on the number of transactions pending in that server.

We claim:

1. A server in a client/server computing system for distributed transaction processing, the server comprising:
   a server resource having local data associated therewith;
   means for receiving a registration request from the server resource requesting that the server resource be registered in a transaction, after the server resource has received a transaction context of the transaction in an explicit transaction propagation mode; and
   means for creating a distributed transaction object representing the transaction in response to receipt of the registration request, the distributed transaction object persisting until the transaction is completed.

2. The server of claim 1 wherein said means for receiving and said means for creating are embodied in a coordinator proxy object.

3. The server of claim 1 wherein said distributed transaction object registers itself with a remote coordinator object.

4. The server of claim 3 wherein said distributed transaction server object receives transaction completion data from said remote coordinator object when the transaction is finishing, and passes along such completion data to said server resource.

5. A method in a server of taking part in the processing of a distributed transaction within a client/server computing system, the server having a server resource with local data associated therewith, the method comprising steps of:
   receiving a registration request from the server resource requesting that the server resource be registered in a transaction, after the server resource has received a transaction context of the transaction in an explicit transaction propagation mode; and
   creating a distributed transaction object representing the transaction in response to receipt of the registration request, the distributed transaction object persisting until the transaction is completed.

6. The method of claim 5 wherein the steps of receiving and creating are carried out in a coordinator proxy object.

7. The method of claim 5 wherein said distributed transaction object registers itself with a remote coordinator object.

8. The method of claim 7 wherein said distributed transaction object receives transaction completion data from said remote coordinator object when the transaction is finishing, and passes along such completion data to said server resource.

9. A computer program product stored on a computer-readable storage medium for, when run on a computer, performing a method in a server of taking part in the carrying out of a distributed transaction in a client/server computing system, the server having a server resource with local data associated therewith, the computer program product comprising code portions for performing the steps of:
   receiving a registration request from the server resource requesting that the server resource be registered in a transaction, after the server resource has received a transaction context of the transaction in an explicit transaction propagation mode; and
   creating a distributed transaction object representing the transaction in response to receipt of the registration request, the distributed transaction object persisting until the transaction is completed.

10. The program product of claim 9 wherein the steps of receiving and creating are carried out in a coordinator proxy object.

11. The program product of claim 9 wherein said distributed transaction object registers itself with a remote coordinator object.

12. The program product of claim 11 wherein said distributed transaction object receives transaction completion data from said remote coordinator object when the transaction is finishing, and passes along such completion data to said server resource.

* * * * *